US012162963B2

(12) United States Patent
Gaffiot et al.

(10) Patent No.: US 12,162,963 B2
(45) Date of Patent: Dec. 10, 2024

(54) FUNCTIONALIZATION AND REINFORCEMENT IN THE DRY STATE AND IN THE WET STATE OF A CELLULOSIC MATERIAL BY AN OXIDIZED POLYSACCHARIDE

(71) Applicant: CENTRE NATIONAL DE LA RECHERCHE SCIENTIFIQUE, Paris (FR)

(72) Inventors: Lauric Gaffiot, Grenoble (FR); Laurent Heux, Saint Martin d'Uriage (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 826 days.

(21) Appl. No.: 17/273,842

(22) PCT Filed: Sep. 5, 2019

(86) PCT No.: PCT/EP2019/073742
§ 371 (c)(1),
(2) Date: Mar. 5, 2021

(87) PCT Pub. No.: WO2020/049116
PCT Pub. Date: Mar. 12, 2020

(65) Prior Publication Data
US 2021/0332160 A1 Oct. 28, 2021

(30) Foreign Application Priority Data

Sep. 7, 2018 (FR) ......................... 1858068

(51) Int. Cl.
| | | |
|---|---|---|
| *C08B 37/00* | (2006.01) | |
| *D21H 17/24* | (2006.01) | |
| *D21H 17/31* | (2006.01) | |
| *D21H 21/16* | (2006.01) | |
| *D21H 21/20* | (2006.01) | |

(52) U.S. Cl.
CPC ...... *C08B 37/0057* (2013.01); *C08B 37/0087* (2013.01); *C08B 37/0093* (2013.01); *C08B 37/0096* (2013.01); *D21H 17/24* (2013.01); *D21H 17/31* (2013.01); *D21H 21/16* (2013.01); *D21H 21/20* (2013.01)

(58) Field of Classification Search
CPC ............ C08B 37/0057; C08B 37/0087; C08B 37/0093; C08B 37/0096; D21H 17/31; D21H 21/20; D21H 21/18
See application file for complete search history.

(56) References Cited

U.S. PATENT DOCUMENTS

| | | |
|---|---|---|
| 3,086,969 A | 4/1963 | Slager |
| 3,205,125 A | 9/1965 | Opie et al. |
| 4,788,280 A | 11/1988 | Billmers |
| 5,554,745 A | 9/1996 | Chiu |
| 6,225,462 B1 | 5/2001 | Berry |
| 2003/0208062 A1 | 11/2003 | Cimecioglu |
| 2012/0009132 A1 | 1/2012 | Tholath |

FOREIGN PATENT DOCUMENTS

| | | |
|---|---|---|
| CN | 102363937 A | 2/2012 |
| CN | 102363939 A | 2/2012 |
| JP | 38-13799 B | 7/1962 |
| JP | 47-18845 B | 5/1972 |
| JP | H01242601 A | 9/1989 |
| JP | H06294094 A | 10/1994 |
| JP | H09105096 A | 4/1997 |
| JP | H11507109 A | 6/1999 |
| JP | H11508647 A | 7/1999 |
| JP | 2001122904 A | 5/2001 |
| JP | 2001527134 A | 12/2001 |
| JP | 2002500287 A | 1/2002 |
| JP | 2006241601 A | 9/2006 |
| JP | 2012512268 A | 5/2012 |
| WO | 9736052 A2 | 10/1997 |
| WO | 9736054 A2 | 10/1997 |
| WO | 9933879 A1 | 7/1999 |

(Continued)

OTHER PUBLICATIONS

Kohnke et al., Carbohydrate Polymers, 2014, 100, p. 24-30. (Year: 2014).*
Borjesson et al., Carbohydrate Polymers, 2018, 202, p. 280-287, Available online Aug. 29, 2018. (Year: 2018).*
Holik, H., ed., Handbook of Paper and Board, 2006, Wiley-VCH Verlag GmbH & Co. KGaA., p. 62-149. (Year: 2006).*
Kochumalayila et al., Carbohydrate Polymers, 2013, 93, p. 466-47. (Year: 2013).*
International Search Report for PCT/EP2019/073742 dated Nov. 19, 2019, 6 pages.
Written Opinion of the ISA for PCT/EP2019/073742 dated Nov. 19, 2019, 6 pages.

(Continued)

*Primary Examiner* — Jonathan S Lau
(74) *Attorney, Agent, or Firm* — NIXON & VANDERHYE (57) ABSTRACT

Disclosed are compounds, in particular based on polysaccharides, that are adsorbed on a cellulosic material, and relates in particular to the application of such compounds as reinforcing agent for cellulosic materials, in the wet and/or dry state. The compounds include a combination of at least one polysaccharide adsorbed on a cellulosic material, the polysaccharide including at least two different monosaccharide units, forming first and second monosaccharide units, the second monosaccharide units being branched on a chain including at least the first monosaccharide units, at least some of the second monosaccharide units being non-cyclic and bearing aldehyde functions, the aldehyde functions possibly forming hemiacetal functions with hydroxy functions of the cellulosic material.

17 Claims, 7 Drawing Sheets

(56) References Cited

FOREIGN PATENT DOCUMENTS

WO          9934058 A1    7/1999
WO          9936469 A1    7/1999

OTHER PUBLICATIONS

French Search Report for FR 1858068 dated May 23, 2019, 2 pages.
Office Action, issued in Japanese Patent Application No. 2021-512748 dated Oct. 10, 2023.
Office Action, issued in Japanese Patent Application No. 2021-512748 dated Jul. 29, 2024.

* cited by examiner

FUNCTIONALIZATION AND REINFORCEMENT IN THE DRY STATE AND IN THE WET STATE OF A CELLULOSIC MATERIAL BY AN OXIDIZED POLYSACCHARIDE

CROSS-REFERENCE TO RELATED APPLICATIONS

This application is the U.S. national phase of International Application No. PCT/EP2019/073742 filed Sep. 5, 2019 which designated the U.S. and claims priority to FR 1858068 filed Sep. 7, 2018, the entire contents of each of which are hereby incorporated by reference.

BACKGROUND OF THE INVENTION

Field of the Invention

The present invention concerns compounds, particularly polysaccharide-based compounds, that are adsorbed on a cellulosic material. In particular the present invention concerns the application of said compounds as reinforcing agent of cellulosic materials, in the wet and/or dry state.

Description of the Related Art

One of the technical issues is to develop reinforcing agents that are easy to use, particularly at industrial level, and preferably low-cost. Cellulosic materials such as typically papermaking fibres or textile fibres are widely used in numerous applications (paper and paperboard for packaging, graphic printing, specialty paper, composite reinforcement . . . ). In numerous applications the water sensitivity of these materials is a major restraint for the use thereof, although their bio-renewable nature makes them attractive from the viewpoint of sustainable development. Numerous additives have already been developed in the past to impart Wet Strength (WS) to treated cellulosic materials.

The solutions recommended in the state of the art generally require specific, more or less complex processes mostly having recourse to compounds derived from the petrochemical industry and of recognised toxicity (glyoxal, formaldehyde, epichlorohydrin, etc.).

Also, and in general, the additives or reinforcing agents used have properties reinforcing the strength of cellulosic materials either in the dry state, or in the wet state. But it is difficult to identify agents reinforcing the strength of cellulosic materials both in the wet state and in the dry state. The state of the art generally uses different additives to fulfill these two technical functions. There is therefore an advantage in developing novel reinforcing agents to overcome this technical problem.

Additionally, in general, existing products derived from the petrochemical industry are, or are suspected of being toxic. To bypass this difficulty, proportions are reduced and/or the commercial use of these products is restricted.

In general, for applications in which the reinforcing agents must be efficient in the wet state, the solutions currently proposed are not satisfactory, in particular because reinforcement necessitates the use of toxic products and cumbersome processes or equipment of complex architecture and/or comprising aluminum foil or plastic. Industrialists will often prefer a plastic material, which is regrettable.

A paper-forming process is known from patent U.S. Pat. No. 3,205,125 comprising a step to add from 0.1 to 5% of an oxidized polygalactomannan gum to the paper pulp prior to sheet formation, the oxidizing agent being periodic acid or the alkali metal salts thereof and being used in an amount of 0.01 to 0.4 mole per anhydrous hexose unit.

Derivatives of polysaccharides are also known from patent U.S. Pat. No. 5,554,745 which contain galactose containing cationic aldehydes obtained by oxidization with galactose oxidase enzyme. The products oxidized by the enzyme have an aldehyde function at a specific position of the polysaccharide, i.e. at position C6 of the galactose unit. These cationic derivatives are used as paper strengthening additives.

SUMMARY OF THE INVENTION

It has been discovered by the inventors that a compound of the present invention allows the solving of at least one and preferably all the technical problems set forth in the present invention.

It is notably the object of the present invention to solve the technical problem of providing a new compound able to act as reinforcing agent of a cellulosic material, in particular to reinforce the strength of the cellulosic material in the dry and/or wet state.

It is the object of the present invention to solve the technical problem of providing a resistant cellulosic material in the wet state in particular, and preferably in the dry and wet state.

It is the object of the present invention to solve the technical problem of providing a method allowing the controlled preparation of said compound.

It is particularly the object of the invention to solve the technical problem of providing said compound and the preparation method thereof that is heedful of the environment, and in particular to use compounds of natural origin with limited use of toxic materials.

It is the object of the present invention to solve the technical problems industrially, reliably and preferably at low cost without modifying the existing process.

DESCRIPTION OF THE PREFERRED EMBODIMENTS

In particular, the present invention concerns the preparation of polysaccharide compounds, the complexing thereof with a cellulosic material and applications thereof in particular as agents to reinforce the strength of cellulosic materials in the dry and/or wet state.

The present invention concerns a compound comprising an association of at least one polysaccharide adsorbed on a cellulosic material, said polysaccharide comprising at least two different monosaccharide units forming first and second monosaccharide units, said second monosaccharide units being branched on a chain comprising at least said first monosaccharide units, at least some of the second monosaccharide units being non-cyclic and bearing aldehyde functions, said aldehyde functions possibly forming hemiacetal functions with hydroxy functions of the cellulosic material.

In one embodiment, the polysaccharide comprises a chain with 1-4 glucan bonds, and preferably $\beta(1\rightarrow 4)$ glucan bonds.

In one embodiment, the branched monosaccharides are xyloses, and preferably $\alpha(1\rightarrow 6)$ xylose branches.

In one embodiment, the non-cyclic branched monosaccharides bearing aldehyde functions are oxidized xyloses.

In one embodiment, the adsorbed polysaccharide comprises a glucan chain, a mannan chain and/or an xylan chain.

In one embodiment, the adsorbed polysaccharide is selected from the group composed of a xyloglucan, a glucomannan, a mannan and a galactomannan.

In one embodiment, the adsorbed polysaccharide is selected from the group composed of a tamarind seed xyloglucan (TXG), a pea xyloglucan, a low-galactose galactomannan, an enzyme-modified guar gum (emg), a tara gum, cassia gum, locust bean gum, and any of the mixtures thereof.

In one embodiment, the adsorbed polysaccharide is a xyloglucan.

In the invention, preference is given to xyloglucan.

Figure 1:
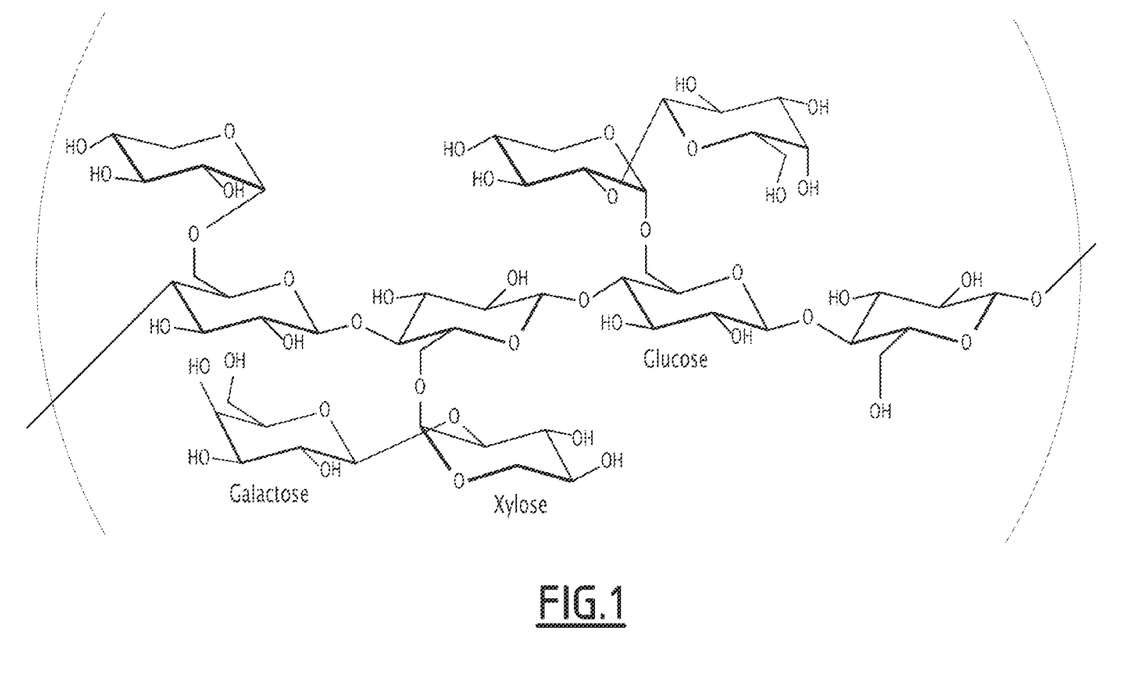
FIG. 1 illustrates a branched structure of a compound of the invention with a backbone of D-glucopyranose units linked together by β1→4 bonds and branched.

The inventors have discovered that this hemicellulose, adsorbing on a cellulosic material and on cellulose in particular, e.g. xyloglucan extracted from tamarind (especially the seeds), once oxidized still maintains the property of adsorbing on the cellulosic material and, after drying, forms hemiacetal bonds with the cellulosic material thereby imparting properties of interest thereto. This water-soluble molecule has a branched structure described in FIG. 1, with a backbone of D-glucopyranose units linked together via β1→4 bonds and branched. On average, 3 out of 4 units are substituted at position O6 by D-xylose chains. They can also be substituted at position O2 and form side chains with galactose, fucose and/or arabinose (FIG. 1).

In the present invention, as polysaccharide, it is also possible to use other oxidized hemicelluloses adsorbing on a cellulosic material such as xylan, galactomannan or glucogalactomannan also having oxidizable side chains.

The type and distribution of these side chains varies according to tissue and plant species. Xyloglucan derived from tamarind seeds and used in the invention generally has a galactosylation rate of about 85% (in general from 80 to 90%).

The method for preparing a compound of the invention comprises oxidation of the polysaccharide, advantageously by periodate or any other reagent allowing cleavage to be obtained of the C2-C3 bond and producing up to 2 aldehydes per sugar.

The amount of formed aldehyde advantageously varies according to kinetics and/or the amount of added oxidant. This translates as degree of oxidation, a magnitude which characterizes progress of the reaction, the measurement of which is detailed in the invention.

Preferably, the polysaccharide is oxidized by an oxidizing agent. Preferably the polysaccharide is oxidized by a periodate, and preferably sodium metaperiodate.

In the present invention, Xg represents xyloglucan and XgOx the oxidized xyloglucan.

The polysaccharide is preferably solubilized before oxidation, but can also be oxidized in the form of a slurry which is a mixture of polymer and water in a highly concentrated paste. Solubilization preferably takes place in an aqueous phase and more preferably in water as sole solvent.

The protocol for oxidation is preferably the following, for example with reference to xyloglucan:

The xyloglucan is solubilized in deionized water under dispersive mechanical stirring. The concentrations are fixed by weighed amounts of between 0.1 and 2% depending on tests. The metaperiodate is added in a concentrated solution and the reaction left to take place overnight, after which the reaction medium is purified by dialysis.

The reaction can advantageously be characterized for example by the degree of oxidation. In the present invention, an oxime-formation assay is used:

The quantity of aldehyde formed is measured by oxime assay. An amount of oxidized Xg equivalent to a dry weight of 0.1 g is weighed and placed in a 100 mL beaker. The addition is made of 25 mL of 0.25 M $NH_2OH,HCl$ solution of which the pH has been previously measured. The reaction is conducted 2 h under agitation and at room temperature. A white precipitate is observed (oxime formation). The solution is titrated with 0.02 M sodium hydroxide, the equivalence corresponding to return to the initial pH of the $NH_2OH,HCl$ solution.

With the volume of sodium hydroxide, the degree of oxidation is calculated using equation 1:

Equation 1: Calculation of degree of oxidation by oxime-formation assay $$\% \ Ox = \frac{V_{NaOH} \times C_{NaOH} \times M_{XG}}{m_{Xgoxs}} \Big/ 18$$

Where $M_{Xg}$=1350 g/mol (molar mass of one Xg unit), $V_{NaOH}$=equivalent volume of sodium hydroxide, $C_{NaOH}$=exact concentration of the sodium hydroxide solution, and $m_{Xgoxs}$=dry weight of added XgOx.

In one embodiment, preference is given to a polysaccharide having a degree of oxidation higher than 0% and lower than or equal to 50%, preferably lower than or equal to 40%, more preferably lower than or equal to 30%, expressed in number of oxidized saccharide units out of the total number of saccharide units.

The following denoting system is adopted in the remainder hereof: abbreviation of the oxidized polysaccharide of type «Ox(%Oxidation)», which means that a 20% oxidized xyloglucan will be denoted XgOx20, or 30% oxidized guar gum will be denoted GOx30, or 63% oxidized locust bean gum will be denoted LOx63.

Preferably, the degree of oxidation is higher than 0 and lower than 40%, and more preferably lower than 20%, the percentages being expressed as number of oxidized saccharide units out of the total number of saccharide units. Regarding tamarind xyloglucan, the degree of oxidation corresponds for example to 0 to 0.5 mol aldehyde/100 g polysaccharide.

Advantageously, the degree of oxidation impacts both adsorption capacity and crosslinking density.

In one variant, the polysaccharide is covalently bonded to the cellulosic material via hemiacetal functions between aldehyde functions of the branched monosaccharides and hydroxy functions of the cellulosic material.

In one variant, the polysaccharide is also covalently bonded by one or more reactive molecules reacting with aldehyde functions of the polysaccharide, said reactive molecules being selected for example from the group comprising amines, polyamines, hydroxylamines, imines, hydrazide and any of the combinations thereof.

Advantageously, the polysaccharide is also covalently bonded by at least two reactive molecules reacting with aldehyde functions of the polysaccharide, said reactive molecules for example being selected from the group comprising amines, polyamines, hydroxylamines, imines, hydrazide and any of the combinations thereof.

The invention also concerns a method whereby an oxidized, reactive polysaccharide is left to adsorb on a cellulosic material (or the reverse), said method comprising the controlled oxidation of a polysaccharide comprising at least two different monosaccharide units, forming first and second monosaccharide units, said second monosaccharide units being branched on a chain comprising at least said first monosaccharide units, at least some of the second monosaccharide units being non-cyclic and bearing aldehyde functions, said aldehyde functions possibly forming hemiacetal functions with hydroxy functions of the cellulosic material, and the contacting of the oxidized polysaccharide with a cellulosic material to form a compound of the invention, advantageously forming a complex of a cellulosic material with an oxidized polysaccharide.

The invention also concerns a method for covalently binding a cellulosic material with a polysaccharide, said method comprising the adsorption of a polysaccharide on a cellulosic material to form a compound of the present invention, and the reaction of aldehyde functions of the polysaccharide with hydroxy functions of the cellulosic material to form hemiacetal functions.

In one variant, the oxidation step is conducted in an aqueous medium in solution or in a slurry in the form of a concentrated paste.

In one embodiment, prior to adsorption of the polysaccharide on the cellulosic material, the method comprises a step to oxidize a precursor polysaccharide of the adsorbable polysaccharide on cellulosic material.

In one embodiment, the oxidation step is controlled to oxidize solely the branches of the polysaccharide.

Advantageously, the method of the invention is implemented under conditions preserving the adsorption properties of the cellulosic material and oxidized polysaccharide.

Advantageously, the method of the invention is implemented under conditions best preserving the molecular weight of the polysaccharide.

In one variant, the weight average molar mass of the polysaccharide ranges from 20 to 700 kDa (Mw).

In one variant, the weight average molar mass of the polysaccharide ranges from 70 to 700 kDa (Mw).

In one variant, the weight average molar mass of the polysaccharide ranges from 100 to 500 kDa (Mw) and for example from 100 to 400 kDa (Mw).

In one embodiment, adsorption is obtained with the cellulosic material in an aqueous medium.

The invention also concerns a method in which a compound of the invention is formed and dried in the form of paper, fibres, nonwovens, other. (Drying allows stabilised crosslinking via the hemiacetal bonds).

Adsorption of the polysaccharide is a key property for application of reinforcement additives. The present invention concerns the link between oxidation and adsorption on a cellulosic material, cellulose in particular. If oxidation is too high, then adsorption no longer occurs. Advantageously, it is sought to maintain the monosaccharide sequence of the polysaccharide backbone during oxidation for sufficient interaction with the cellulosic material to obtain adsorption. Subsequently, this adsorption advantageously allows fixing of the polysaccharide via hemiacetal bonds, between the cellulosic material and the aldehydes contributed by oxidation, that are formed on drying on the cellulosic material.

In one embodiment, the polysaccharide is covalently bonded to the cellulosic substrate and caused to react with one or more reactive molecules reacting with aldehyde functions of the polysaccharide, said reactive molecules for example being selected from the group comprising amines, polyamines, hydroxylamines, imines, hydrazide and any of the combinations thereof.

Among cellulosic materials, particular mention can be made of cellulose fibres, particularly textile fibres such as flax, hemp, hessian, kenaf fibres, paper pulp in particular kraft pulp, sulfite pulp or cotton linters, nanocelluloses e.g. nanofibrillated cellulose (NFC) or cellulose nanocrystals (CNC). In one variant, the oxidized polysaccharide of the invention is added in a weight concentration of 0.001% to 1%, preferably from 0.001% to 0.5%, and more preferably from 0.001% to 0.2%, to the fibrous suspension to be treated i.e. typically to be strengthened.

In one variant the oxidized polysaccharide is added by spraying or by deposition on the already-formed product before drying, or on the already-dried product with an additional drying step.

In another variant, a reactive product having a chemical function able to react with the aldehydes can be added to increase the wet or dry strength or to impart functionalities to the cellulosic material such as an antiseptic, antioxidant nature or specific colouring. The reagent can be taken from the group of amines, polyamines, hydroxylamine, imines, hydrazide or any other compound able to react with the remaining aldehyde functions.

Figure 8:
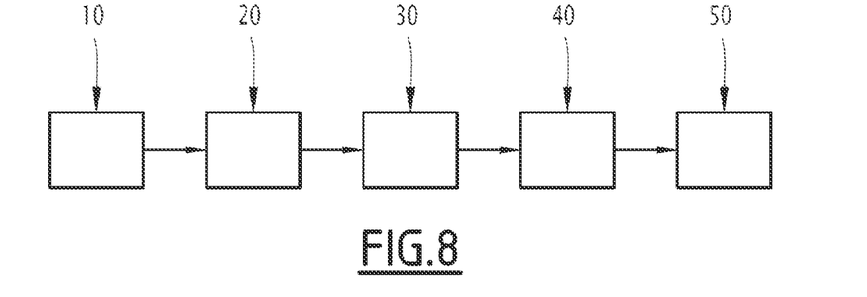
FIG. 8 schematically illustrates a method for producing paper or paperboard.

Advantageously, a compound of the present invention can be added at different stages of paper stock preparation. Schematically, as illustrated in FIG. 8, a method for paper production may comprise this addition at the pulp refining or beating step 10 using refining equipment or beaters, at step 20 to mix refined pulp in the event that there is more than one feed of paper pulp, at step 30 to add chemical products to obtained the desired paper or paperboard product, at step 40 to transfer the prepared paper or paperboard pulp to the paper preparation machine, at step 50 to prepare the stock for paper production at the wet end.

It is possible for example to add a compound of the present invention at one or more of these steps, and in particular at steps 10, 20, 30 or 40. Or to the stock preparation at the wet end of the machine.

Therefore, according to one variant, a compound of the present invention is added to the stock preparation.

In another variant, a compound of the present invention is added at the wet end.

Advantageously, existing processes do not need to be modified for the addition of a compound of the present invention. The term addition to iso-procedure is used.

The invention further concerns the use of a polysaccharide as reinforcing additive for cellulosic material comprising hydroxy functions, said polysaccharide comprising non-cyclic branched monosaccharides bearing aldehyde functions, wherein some aldehyde functions possibly form hemiacetal functions with some hydroxy functions of the cellulosic material, said polysaccharide being able to adsorb on the cellulosic material and preferably to form a compound defined in the present invention.

In one variant, the polysaccharide is used as additive to reinforce the strength in the wet state of a cellulosic material comprising hydroxy functions.

In one variant, the polysaccharide is used as additive to reinforce the strength in the dry state, and preferably in the dry and wet state, of a cellulosic material comprising hydroxy functions.

The invention also concerns the use of one of more reactive molecules reacting with aldehyde functions of the compound such as defined in the invention, to impart a new functionality to the compound, for example antiseptic, colouring, and/or to increase the mechanical properties of the material thus formed, said reactive molecules being selected for example from the group comprising amines, polyamines, hydroxylamines, imines, hydrazide and any of the combinations thereof.

Other objectives, characteristics and advantages of the invention will become clearly apparent to those skilled in the art on reading the explanatory description referring to examples given solely as illustration and which cannot in any manner be construed as limiting the scope of the invention.

The examples are an integral part of the present invention and any characteristic appearing to be novel, compared with any prior state of the art, from the description taken as a whole including the examples, forms an integral part of the invention with regard to the function and generality thereof. Therefore, the scope of each example is general.

Also, in the examples, all percentages are given in weight unless otherwise stated, temperature is expressed in degrees Celsius unless otherwise stated, and pressure is atmospheric pressure unless otherwise stated.

The degrees of oxidation of xyloglucan given in the examples are evaluated by oxime-formation assay.

EXAMPLES

Example 1: Preparation of XgOx 1.1. Oxidation of Xyloglucan.

| Equipment: | Flaw materials: |
|---|---|
| 2 1 L beakers. | 10 g of tamarind Xyloglucan. |
| Balance. | Q.S. NaIO4. |
| 2 magnetic stirrers. | About 650 mL distilled water. |
| Magnetic plate. | |

Operating Mode:

Weigh about 10 g of tamarind Xyloglucan in a 1L beaker.

In a 1L beaker, weigh the desired equivalent of sodium periodate which is solubilized under stirring in about 650 mL of distilled water.

Pour the solubilized periodate solution into the beaker containing the xyloglucan.

Leave the beaker under stirring (about 700 rpm), until the mixture does not become too viscous and the stirrer no longer rotates.

Cover the beaker with a parafilm and leave to stand overnight.

1.2. Purification of the Solution

Principle:

For purification of the solution, dialysis is performed allowing the salts and small molecules to pass through a membrane and into a basin of water. The water must therefore be changed often since, when equilibrium between the ions in the solution and pure water is reached, purification no longer occurs.

Dialysis is completed when the conductivity of the water is less than10 μS/cm.

A purified, oxidized xyloglucan is recovered.

Example 2: Impact of Oxidation on the Oxidized Xyloglucan

Yields

Figure 2:
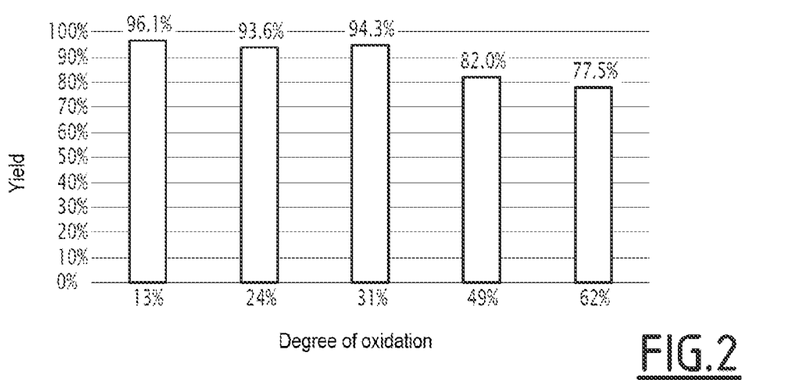
FIG. 2 gives the weight yield of the reaction in Example 2 for different degrees of oxidation on 1.42 g of xyloglucan in 0.8% solution.

The weight yield of the reaction was examined for different degrees of oxidation on 1.42 g of xyloglucan in 0.8% solution. The final weight was calculated after dialysis by gravimetry, and the results are given in FIG. 2. The reaction gives a good yield of about 95% for moderate oxidation rates of up to about 30%. The low loss of matter in this case is the result of the different operating phases. On the other hand, for higher oxidation rates, the yield is decreased since it drops to 82% for 49% oxidation, then to 77.5% for 62% oxidation. Loss of matter here is due to purification via dialysis. The cut-off threshold of the equipment used is 14000 g/mol. Therefore, after chain rupturing, a large amount of matter of lower molecular weight can be evacuated. These phenomena are examined in the following paragraphs.

Molecular Weights

Oxidation of the polysaccharides is systematically accompanied by a drop in molecular weight. Oxidation was performed on 1 g of xyloglucan in 0.4% solution. Different degrees of oxidation were performed and the molecular weights of the products obtained were controlled. The measured results are given in Table 1.

TABLE 1

Trend in weight average (Mw) and number average (Mn) molar mass and in the polydispersity index (PDI) of Xg as a function of oxidation rate.

| | Mw (kDa) | Mn (kDa) | PDI |
|---|---|---|---|
| Xyloglucan | 863 ± 5.4 | 652 ± 15.9 | 1.32 ± 0.03 |
| XgOx9 | 376 ± 1.9 | 283 ± 4.9 | 1.33 ± 0.02 |
| XgOx21 | 130 ± 1.8 | 99 ± 1.4 | 1.31 ± 0.02 |
| XgOx30 | 155 ± 2.5 | 108 ± 1.3 | 1.44 ± 0.007 |
| XgOx46 | 133 ± 4.8 | 103 ± 4.4 | 1.29 ± 0.01 |
| XgOx59 | 28 ± 1.1 | 23 ± 1.0 | 1.25 ± 0.01 |

Oxidation can have a significant impact on the molecular weight of the polysaccharide.

For example, under the preparation conditions of Example 1, at 10% oxidation, the molecular weight was largely modified since it is divided by two. It further decreases by a factor of 2 at 20%, then appears to stabilise up to about 50%. However, it drops to 23 kDa at 60% oxidation i.e. just twice the value of the cut-off threshold of the membranes used for purifications which is 14 kDa. This last drop occurs at a degree of oxidation which necessarily involves oxidation of the glucoses which form the backbone of the molecule, and degradation thereof can account for said decrease in molecular weight.

Impact on Adsorption

The impact of the oxidation reaction on the molecular weights and structure of the polymer can modify the physicochemical properties thereof. The adsorption properties of XgOx were therefore controlled: the solution of XgOx and suspension of NFC were left under stirring for 1 h. The equivalent dry weights added were 0.3 g of XgOx and 0.3 g or 0.9 g of NFC according to study. Different concentrations were examined. After centrifugation at 11200 rpm at 10° C. for 30 minutes, the supernatant was removed and the residue redispersed in deionized water. After a second centrifugation under the same conditions, the residue was placed in an oven and weighed. The difference between the weight obtained and the initial dry weight of NFC gives the amount of adsorbed XgOx.

Figure 3:
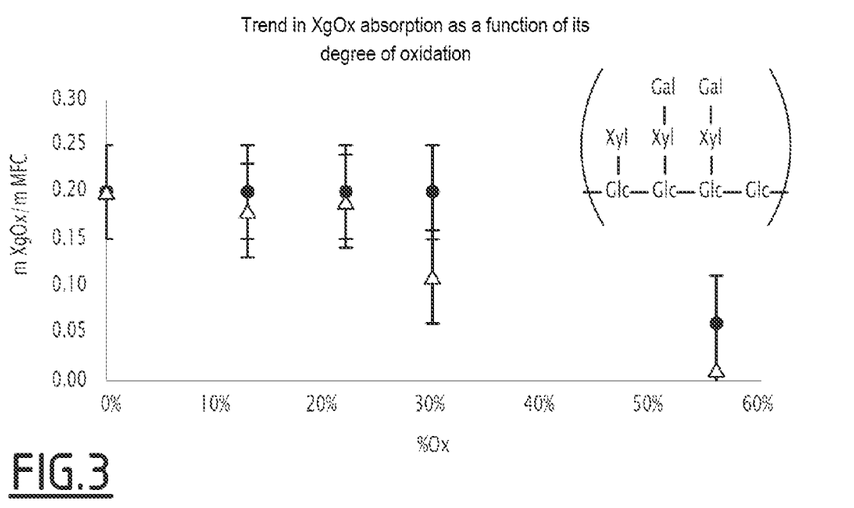
FIG. 3 illustrates the trend in adsorption of oxidized xyloglucan as a function of its degree of oxidation for weight proportions of xyloglucan and celluloses in 0.2% solution of 1 per 1 (●) and 1 per 3 (Δ)

FIG. 3 shows the trend in the amount of adsorbed Xg for a 0.2 weight concentration in solution, as a function of degree of oxidation, for 2 proportions of different nanofibrillated cellulose (circle: 1 per 1; triangle: 1 per 3). The adsorption capacity of Xg is not affected up to the region of 30% oxidation. Thereafter, a major decrease is observed in adsorption properties which become practically zero after 50%. At this degree of oxidation, the glucose backbone of the chain responsible for Xg adsorption starts to be oxidized thereby modifying the behaviour thereof. The presence of the aldehydes and rupture of a carbon-carbon bond will gradually increase the flexibility of the chain and modify its capacity to form hydrophobic interactions and hydrogen bonds. XgOx must therefore preferably be used at degrees of oxidation of about 0 to 25%, to ensure the maintained adsorption capacity of the product.

Example 4: Use as Reinforcing Additive

Oxidized xyloglucans were used as paper reinforcing additives in both the dry and wet states.

Different formulations were tested with different degrees of oxidation DO, different concentrations, different sources of paper pulp and different molar masses.

1. Variations in Cellulose Sources.

i. NFC Films

NFC and XgOx films were prepared by tape casting: the NFC suspension at 2.23 weight % is added to obtain the desired quantity, followed by addition of xyloglucan in solution, and the total volume is adjusted to 50 ml with deionized water. The final dry weights of the films are 0.5 g, with Xg/XgOx proportions of 0, 1, 5, 10 and 25 weight % of the dry film. The mixture is stirred 2 h at room temperature then poured into a Petri dish. Tape casting is carried out under a hood at room temperature to complete dryness. The films are then subjected to tensile tests.

Figure 4:
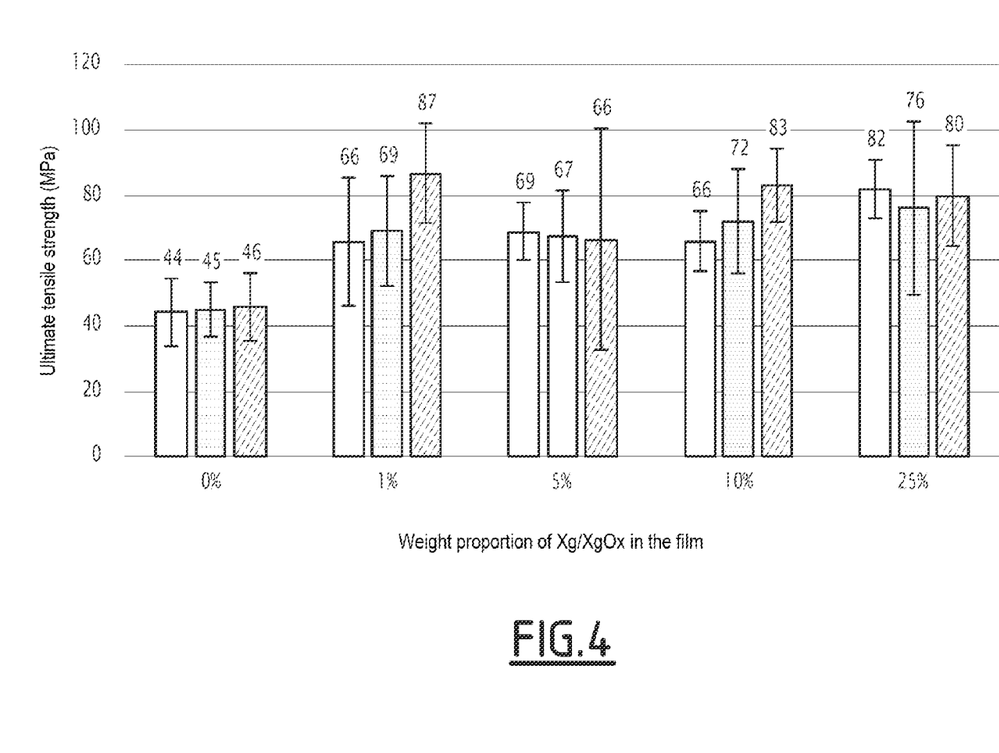
FIG. 4 illustrates the impact of the proportion of xyloglucan (white), XgOx11 (grey) and XgOx23 (shaded) on the ultimate tensile strength of NFC films.

FIG. 4 shows the trend in the properties of the dry films as a function of the proportion of XgOx and for different degrees of oxidation.

Xyloglucan and oxidized xyloglucan reinforce NFC films in the dry state in similar manner with a gain of about 50% in yield strength, the proportions and degree of oxidation not displaying any significant impact.

The same experiment was reproduced on wet films, after immersion for 1 h in water. The results are given in FIG. 5.

Figure 5:
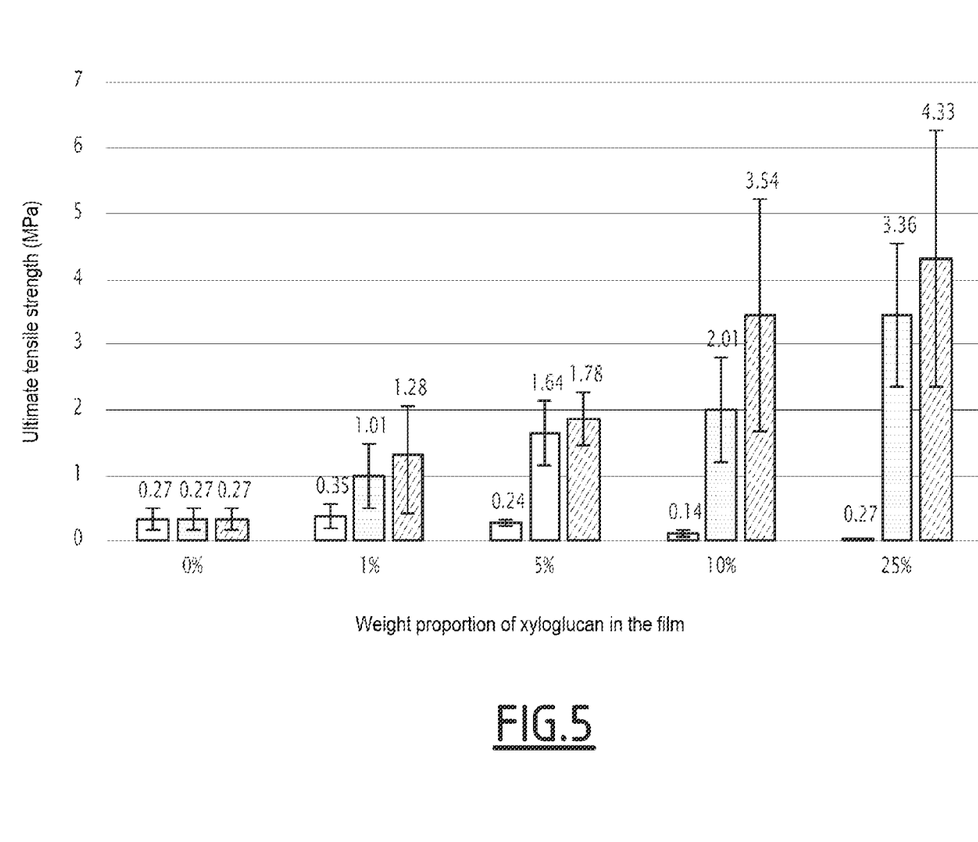
FIG. 5 illustrates the impact of the proportion of xyloglucan (white), XgOx11 (grey) and XgOx23 (shaded) on the ultimate tensile strength of wet NFC films.

The reinforcing effect is pronounced for the two different degrees of oxidation, whereas it is nil for the non-oxidized Xg.

ii. Flax Fibre

The role of the additive was also tested on flax fibres. Technical bundles were soaked in about 20% oxidized XgOx solution, concentrated to 1 weight % (XgOx22 indicating 22% oxidized xyloglucan. This denoting system is used in the other examples by analogy). After rinsing and drying, these fibres were subjected to tensile testing, first in the dry state (Table 2).

TABLE 2

Mechanical properties of treated technical fibres, standard deviations are given in brackets.

|  | Yield strength (MPa) | Young's modulus (GPa) | σ/E |
|---|---|---|---|
| Non-treated fibres | 813 (270) | 58 (13) | 1.38 (0.21) |
| XgOx22 | 755 (157) | 55 (5.6) | 1.37 (0.24) |

No significant difference in property is noted between the treated and non-treated fibres. On the other hand, Table 3 gives the results obtained on wet fibres:

TABLE 3

Mechanical properties of the wet technical fibres, standard deviations are given in brackets.

|  | Yield strength Max (MPa) | Young's modulus (GPa) | Deformation max (%) |
|---|---|---|---|
| Non-treated fibres | 159 (81) | 27 (8) | 0.60 (0.33) |
| XgOx22 | 375 (185) | 23 (9) | 1.28 (0.42) |

A significant increase is observed in the yield strength of the fibres, despite large standard deviations.

iii. Paper Pulp

Paper samples of handsheet type were prepared from different pulps: Kraft pulp, a sulfite and cotton linters. Suspensions containing 2 g/l cellulose and 0.01% XGOX20 (XgOx20) were prepared, filtered and dried on handsheet moulds to obtain paper of about 60 g/m². The samples were subjected to tensile testing before and after 48h immersion in water. The results are detailed in Table 4.

TABLE 4

Effect of XGOX20 additive on papers derived from different types of pulp.

|  |  | Dry (MPa) | Wet (MPa) | Wet/Dry ratio Ref• |
|---|---|---|---|---|
| Kraft | Ref. | 22 | 0.05 | 10% |
|  | XGOX20 | 40 | 2.5 |  |
| Sulfite | Ref. | 6.15 | 0.15 | 20% |
|  | XGOX20 | 10.13 | 1.25 |  |
| Cotton | Ref. | 4.7 | 0.12 | 30% |
|  | XGOX20 | 10.1 | 1.25 |  |

Significant strengthening is observed with XGOX20 in the dry state of up to about 100% of initial strength. Strengthening is also noted in the wet state of 10 to 30% depending on pulp and under these conditions.

2. Effect of Concentrations.

XGOX20 was directly added to the paper stock before forming. XgOx was therefore fixed onto the fibres by adsorption. Different concentrations of additive in the stock were tested, and the properties of the papers prepared as follows are given in Table 5:

1 L of fibrous suspension at 2 g/L+1 L water were added to a Büchner flask containing 3 paper filters stacked on a nylon filtration fabric of porosity 215 μm and 18.5 cm in diameter. Filtration was performed under the vacuum of a water pump and the paper obtained was dried at room temperature (25° C.) for 24 h, then in an oven at 60° overnight.

Ref. Solution: 100% Kraft pulp in tap water.

0.001 XGOX20: XgOx20 in 0.001% solution in the Kraft pulp suspension.

0.01 XGOX20: XgOx20 in 0.01% solution in the Kraft pulp suspension.

0.5 XGOX20: XgOx20 in 0.5% solution in the Kraft pulp suspension.

TABLE 5

Trend in the effect of XGOX20 additive as a function of its weight concentration in the paper pulp (Kraft).

| | | 0% XGOX20 | 0.001% XGOX20 | 0.01% XGOX20 | 0.5% XGOX20 |
|---|---|---|---|---|---|
| Ultimate strength (MPa) | dry | 6.53 (1.2) | 12.76 (0.6) | 14.68 (2.5) | 18.80 (2.78) |
| | wet | 0.00 | 0.98 (0.1) | 1.25 (0.2) | 2.28 (0.3) |

Standard deviations are given in brackets.

Very distinct gains in yield strength are ascertained, both in the dry and wet states, on and after 0.001 weight % of XGOX20 in the starting fibrous suspension (2 g/l). However, the effect appears to increase with concentration.

3. Effect of Degree of Oxidation (DO)

Xyloglucan was used as additive for different degrees of oxidation.

1 L of fibrous suspension at 2 g/L containing 0.1 weight % of XgOx+1 L water were added to a Büchner flask containing 3 paper filters stacked on a nylon filtration fabric of 215 μm porosity and 18.5 cm in diameter. Filtration was performed under the vacuum of a water pump and the paper obtained was dried at room temperature for 24 h, then in an oven at 60° overnight.

The degree of oxidation will impact both adsorption capacity and crosslinking density.

average degrees of oxidation (10<% Ox<25), the equilibrium is optimal between adsorption of the product and crosslinking density. Beyond 25%, the glycose backbone will be oxidized and adsorption capacity decreases. This translates as a reduction in mechanical properties in the dry state and in the wet state. A certain percentage of reinforcement is observed however which can be accounted for by the adsorption of a fraction of the chains which maintain a structure compatible with adsorption, and by bulk deposition of the product during the production method by filtration. In this case, the high proportion of aldehyde functions present on the chains allows significant crosslinking, the effects of which are mechanically translated.

4. Conclusion

Synthesis of the product was controlled, in particular by controlling the degree of oxidation.

Physicochemical characterization of adsorption shows the formation of the XgOx-cellulose complex.

Different applications have demonstrated the efficacy of the product on various cellulosic substrates.

Example 5: Over-Crosslinking i. Mechanical Properties of NFC Fims

Figure 6:
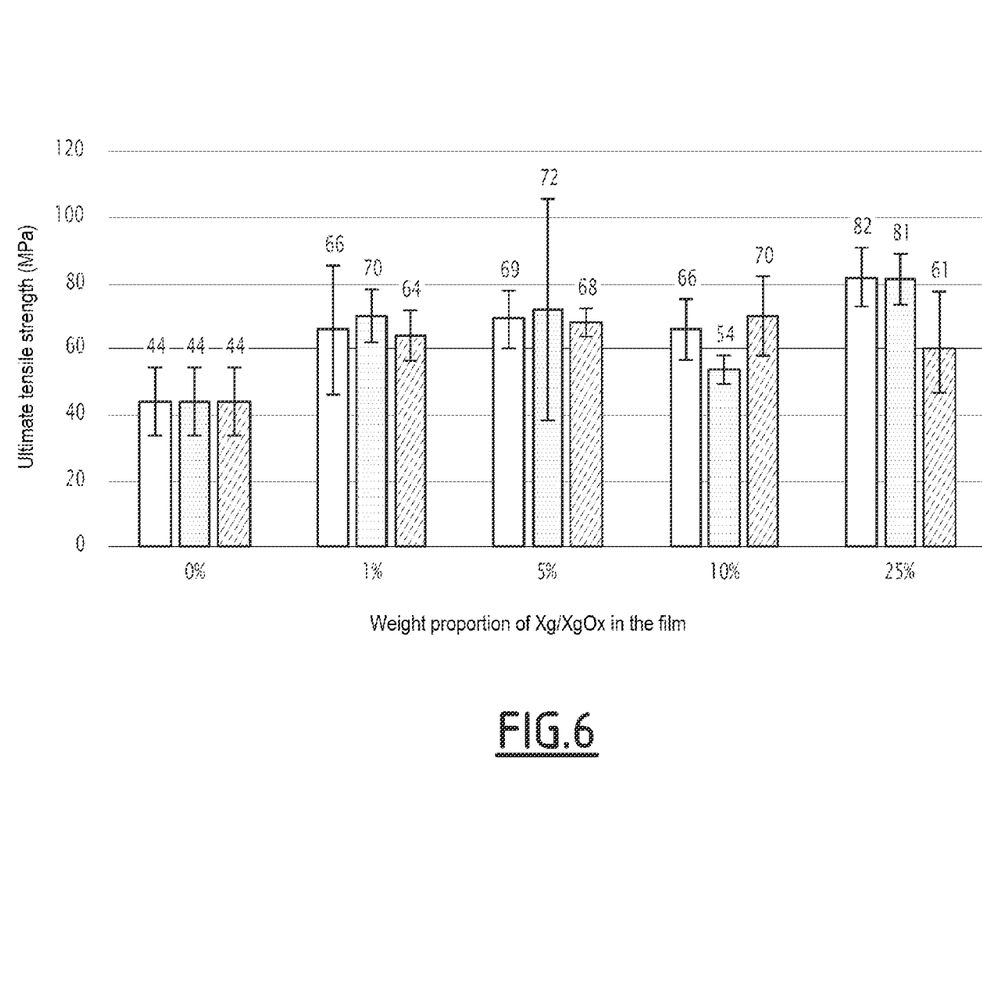
FIG. 6 shows the impact of the weight proportion of xyloglucan (white) and XgOx12 (grey) and XgOx23 (shaded) on the ultimate tensile strength of NFC films post-treated in a 0.3 weight % solution of adipic hydrazide.

NFC films containing different proportions of XgOx were subjected to post-treatment in an aqueous solution of adipic dihydrazide. After drying, tensile tests were applied to the films. The results given in FIG. 6 show the impact of the weight proportion of xyloglucan, XgO12 and XgO23 on the ultimate tensile strength of post-treated NFC films.

The post-treated films were tested after soaking in water. The yield strengths of the wet post-treated films are compared in FIG. 7 with those of NFC-XgOx films.

Figure 7:
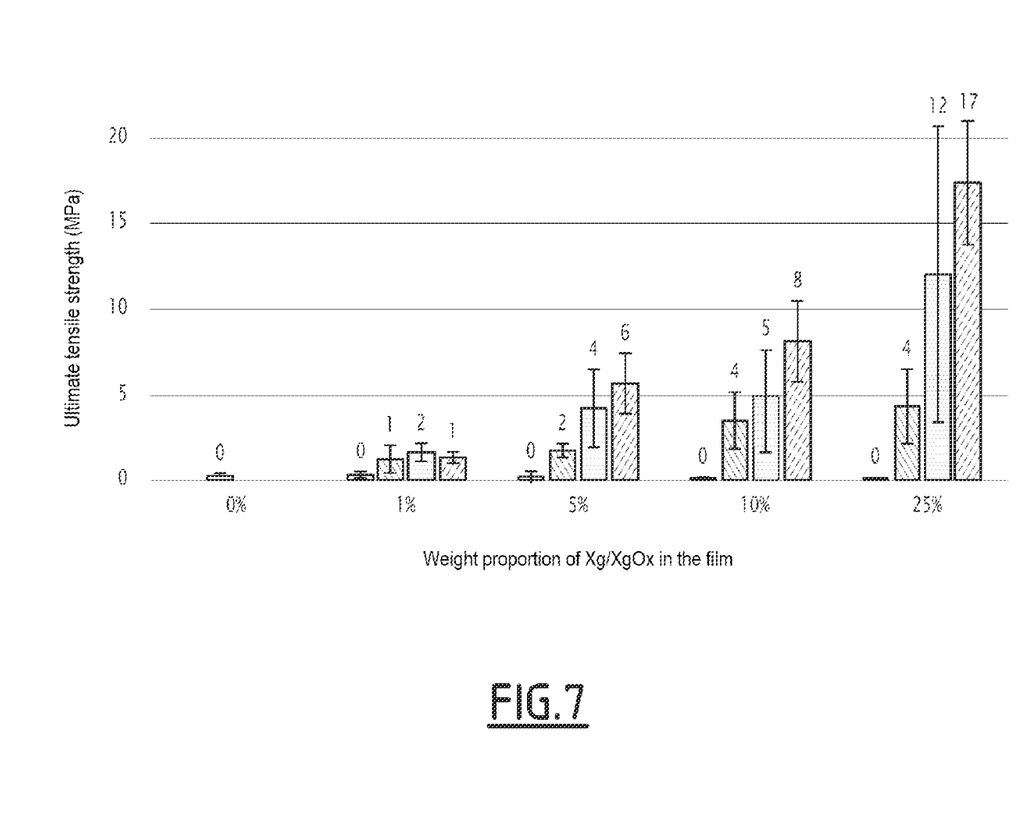
FIG. 7 illustrates the ultimate tensile strength of NFC films and xyloglucan (white, left column), XgOx12 (shaded, second column from the left) and XgOx23 without (grey, third column from the left) and with post-treatment (shaded, right column) with adipic dihydrazide, for different compositions.

In a wet medium, XgOx allows maintained cohesion of the film through the formation of hemiacetals. The addition

TABLE 6

Impact of degree of oxidation of xyloglucan on the mechanical properties of treated papers.

| | | Ref | % Ox = 1% | % Ox = 12% | % Ox = 20% | % Ox = 35% | % Ox = 47% |
|---|---|---|---|---|---|---|---|
| Ultimate strength (MPa) | dry | 6.53 (1.2) | 13.06 (1.9) | 13.9 (2.9) | 13.8 (1.6) | 8.3 (1.8) | 11.04 (2.7) |
| | wet | 0 | 0.012 (0.09) | 0.9 (0.09) | 1.48 (0.19) | 0.36 (0.13) | 0.54 (0.09) |

Standard deviations are given in brackets.

It is therefore noted that at very low % Ox (1%), the product is adsorbed and reinforces the paper in the dry state via the network of H bonds formed by the presence of xyloglucan. On the other hand, in the wet state, no reinforcement is observed due to disappearance of the H bonds and absence of covalent bonds of hemiacetal type. At of dihydrazide further reinforces mechanical properties, all the more so if DO and the proportion of XgOx are high. For example, at 25% XgOx23, the film displays an average strength of 0.4 MPa, which increases up to 17 MPa after post-treatment, i.e. 40% of the value of a dry NFC film.

ii. Mechanical Properties of Papers

The effect of this over-crosslinking was tested on papers. Chitosan, a biosourced amino polymer, was used to obtain a 100% bio-sourced additive system.

Non-Pressed Papers

A first test phase was conducted on papers designed as follows: 1 L of 2 weight % Kraft fibre suspension was prepared, with the concentrations of XgOx 20 specified in the table below. Just before filtration, the volume was increased to 2 L under vigorous stirring after which the suspension was vacuum filtered. After extraction of water, the vacuum was maintained and a 0.01 weight % solution of chitosan was sprayed onto the cake. The papers obtained were dried at room temperature.

The mechanical properties given in Table 7 were obtained.

TABLE 7

Yield strengths of additive-containing papers in the dry and wet states (standard deviations on 5 samples given in brackets) treated by impregnation with chitosan.

|  | dry (MPa) | wet (MPa) |
| --- | --- | --- |
| Ref. | 7.1 (0.82) | 0.1 (0.06) |
| 0.001% XgOx20 | 12.8 (0.6) | 1 (0.1) |
| 0.01% XgOx20 | 14.7 (2.5) | 1.25 (0.22) |
| 0.5% XgOx20 | 18.8 (2.82) | 2.28 (0.33) |
| 0.001% XgOx20 + chitosan | 19.8 (2.5) | 2.3 (0.51) |
| 0.01% XgOx20 + chitosan | 16.2 (3.48) | 3 (0.49) |
| 0.5% XgOx20 + chitosan | 19.7 (3.7) | 4 (0.35) |

In similar manner, papers treated with XgOx35 were over-crosslinked after drying. Paying heed to the same protocol, the papers were dried after filtration, soaked in 0.01 weight % solution of chitosan before further drying. The mechanical properties are given in Table 8.

TABLE 8

Yield strengths of additive-containing papers in the dry and wet states (standard deviations on 5 samples given in brackets), post-treated with chitosan.

|  | σ(Mpa) dry | σ(Mpa) wet |
| --- | --- | --- |
| Ref. | 6.9 (1.2) | 0.1 (0.02) |
| 0.1% XgOx20 | 12 (1.9) | 1.9 (0.14) |
| 0.1% XgOx20 + chitosan | 10.3 (2.25) | 2.7 (0.62) |
| 0.01% XgOx20 | 13.1 (0.18) | 1.6 (0.22) |
| 0.01% XgOx20 + chitosan | 11.6 (1.33) | 2.9 (0.33) |

Papers Prepared on Franck Handsheet Moulds

Additive-containing papers were prepared on Franck handsheet moulds from 1 L of fibrous suspension at 2 g/l and 0.01 weight % of XgOx20. After filtration, a 0.01 weight solution of chitosan was sprayed onto the filter cakes before vacuum drying at 90° for 7 min. The results are given in Table 9.

TABLE 9

Yield strengths of additive-containing papers in the dry and wet states (standard deviations on 5 samples given in brackets) treated by spraying with chitosan.

|  | Classic Paper | XgOx 20 | XgOx20 + chitosan |
| --- | --- | --- | --- |
| dry | 20.1 (0.6) | 38.6 (1.9) | 37.2 (4.0) |
| wet | 0.09 (0.06) | 4.0 (0.07) | 6.73 (0.29) |

Over-crosslinking with chitosan, irrespective of initial XgOx content or treatment method, systematically gave a very significant increase in wet state properties.

Example 6: Use of Another Oxidized Polysaccharide

Synthesis:

10 g of polymers were dissolved in 1 L of water under vigorous stirring. The periodate was added and the reaction conducted for 12 h at room temperature away from light. A solution of 1 weight % oxidized polysaccharide was obtained. Table 10 gives the stoichiometry conditions.

TABLE 10

|  | Stoichiometry (NaIO4/Polym) | Denomination | Weight of added polysaccharide (g) | Weight of added periodate (g) |
| --- | --- | --- | --- | --- |
| Locust bean gum | 0.10 | LOx10 | 10.00 | 1.32 |
|  | 0.19 | LOx20 | 10.43 | 2.64 |
| Guar gum | 0.10 | GOx10 | 9.96 | 1.32 |
|  | 0.20 | GOx20 | 10.12 | 2.64 |

The cellulose was purified to prevent parallel effects of residual periodate and to allow analysis of the products obtained. Dialysis was therefore performed until conductivity was obtained equalling that of laboratory deionized water.

After dialysis, the concentrations were measured as dry matter content. The additives were then used as such.

Paper Characterization:

The oxidized polysaccharides were added to a 2 g/l fibrous suspension of Kraft pulp to reach an additive concentration of 0.01 weight %. After 1 h under agitation, handsheets were prepared by filtration.

The papers obtained were subjected to tensile testing in the dry state after 48 h immersion in deionized water. The different polysaccharides are compared with XGOX20 and with a reference paper not containing additives in Table 11 (below).

Conclusion:

Under the test conditions, the performance of the oxidized polysaccharides derived from guar gum and locust bean gum are far removed from that of the oxidized xyloglucan. The differences are striking both in the dry and wet states.

TABLE 11

|  |  | Paper Ref. | 0.01% XGOX20 | 0.01% GOx10 | 0.01% GOx20 | 0.01% LOx10 | 0.01% LOx20 |
|---|---|---|---|---|---|---|---|
| Ultimate strength (MPa) | dry | 6.53 (1.2) | 14.68 (2.5) | 9.60 (1.36) | 8.66 (0.95) | 8.85 (0.32) | 7.10 (1.01) |
|  | wet | 0 | 1.25 (0.2) | 0.03 (0.02) | 0.06 (0.04) | 0.10 (0.06) | 0.14 (0.03) |

Example 7: Functionalization Test with a Colouring Agent

To show the reactivity of the remaining available aldehyde functions, a Kraft paper not containing additives was prepared as follows: 1 L of Kraft fibre suspension at 2 g/l was vacuum filtered and dried at room temperature.

Papers to which were added XgOx20, XgOx44, Oxidized Guar (GOx44) or oxidized locust bean gum (Cox44), oxidized as in the preceding protocol, were prepared as follows: 1 l of Kraft fibre suspension at 2 g/l containing 0.1% or 0.01 weight % of XgOx20 or XgOx44 or GOx44 or Cox44 were vacuum filtered and dried at room temperature.

A sample was taken measuring 1 cm² of each of the papers containing or not containing additives, and immersed in 2,4-Dinitrophenylhydrazine (DNPH) prepared as follows: 0.19813 of DNPH is weighed and dissolved in a mixture of 3 ml of 37% HCl, 20 ml of ethanol and 20 ml of water, in a 100 ml volumetric flask. After completing the volume with ethanol up to the marking, a 0.01 mol/l DNPH solution is obtained. The samples were left in the DNPH solution for 48 h. After thorough rinsing, the papers without additives displayed a pale-yellow colour whereas the papers containing additives displayed a very pronounced orange colouring (particularly 0.1% Cox44, 0.1 and 0.01% XgOx44) indicating grafting of DNPH onto the aldehydes of the oxidized polysaccharide in the paper according to proportion and type of additive, as per the following reaction:

In a photograph (not illustrated) it can be seen that the paper with additives and the paper without additives, after being placed in contact with the DNPH solution and rinsed, display different colours with a pale-yellow paper for the paper without additives and orange coloured paper for the paper containing additives.

The invention claimed is:

1. A compound comprising an association of at least one polysaccharide adsorbed on a cellulosic material, said polysaccharide being an oxidized xyloglucan comprising at least two different monosaccharide units, forming first and second monosaccharide units, said second monosaccharide units being branched on a chain comprising at least said first monosaccharide units, at least some of the second monosaccharide units being non-cyclic and bearing aldehyde functions, said aldehyde functions possibly forming hemiacetal functions with hydroxy functions of the cellulosic material.

2. The compound according to claim 1, wherein the branched monosaccharides are at least on of xyloses, galactoses, fucoses and arabinoses.

3. The compound according to claim 1, wherein the polysaccharide bearing non-cyclic branched monosaccharides bearing aldehyde functions are oxidized xyloses.

4. The compound according to claim 1, wherein the adsorbed polysaccharide is selected from the group composed of a tamarind seed xyloglucan (TXG), a pea xyloglucan, and any of the mixtures thereof.

5. The compound according to claim 1, wherein the polysaccharide is oxidized by a periodate.

6. The compound according to claim 1, wherein the polysaccharide has a degree of oxidation higher than 0% and lower than or equal to 50%, expressed in number of oxidized saccharide units out of the total number of saccharide units.

7. The compound according to claim 1, wherein the polysaccharide is covalently bonded to the cellulosic material by hemiacetal functions between aldehyde functions of branched monosaccharides and hydroxy functions of the cellulosic material.

8. The compound according to claim 1, wherein the polysaccharide is also covalently bonded by one or more reactive molecules reacting with aldehyde functions of the polysaccharide.

9. The compound according to claim 1, wherein the polysaccharide is also covalently bonded by at least two reactive molecules reacting with aldehyde functions of the polysaccharide.

10. A method for covalently binding a cellulosic material with a polysaccharide, said method comprising the adsorption of a polysaccharide on a cellulosic material to form a compound according to claim 1, and the reaction of aldehyde functions of the polysaccharide with hydroxy functions of the cellulosic material to form hemiacetal functions.

11. The method according to claim 10, wherein adsorption is conducted with the cellulosic material in an aqueous medium.

12. The method according to claim 10, wherein the compound is formed and dried in the form of paper, fibres, or nonwovens.

13. The method according to claim 10, wherein the polysaccharide is covalently bonded to the cellulosic substrate and caused to react with one or more reactive molecules reacting with aldehyde functions of the polysaccharide.

14. The method according to claim 13, wherein the polysaccharide is used as additive to reinforce the strength in the wet state of a cellulosic material comprising hydroxy functions.

15. The method according to claim 13, wherein the polysaccharide is used as additive to reinforce the strength in the dry state of a cellulosic material comprising hydroxy functions.

16. A method of forming the compound of claim 1, comprising adding a polysaccharide as reinforcing additive of a cellulosic material comprising hydroxy functions, said polysaccharide being an oxidized xyloglucan comprising non-cyclic branched monosaccharides bearing aldehyde functions, wherein some aldehyde functions possibly form hemiacetal functions with hydroxy functions of the cellulosic material, said polysaccharide being able to adsorb on the cellulosic material.

17. A method of imparting a new functionality to the compound of claim 1, comprising adding one of more reactive molecules that react with aldehyde functions of the compound, wherein the one or more functions are selected from the group consisting of antiseptic, colouring, and increasing the mechanical properties of the material thus formed, and wherein said reactive molecules are selected from the group consisting of amines, polyamines, hydroxylamines, imines, hydrazide, and any combinations thereof.

\* \* \* \* \*